United States Patent [19]

Hilton

[11] 3,741,315

[45] June 26, 1973

[54] DRILLING OR CUTTING OR EARTH STRATA

[75] Inventor: Allan Richard Hilton, Westhoughton, England

[73] Assignee: Mining Development A.G., Zug, Switzerland

[22] Filed: Dec. 23, 1970

[21] Appl. No.: 101,083

[30] Foreign Application Priority Data
Jan. 8, 1970   Great Britain .......................... 913/70
May 2, 1970   Great Britain .................. 21,221/70

[52] U.S. Cl. ................. 173/105, 173/147, 173/165, 175/57, 175/389
[51] Int. Cl. ........................ E21c 3/30, E21c 13/08
[58] Field of Search ..................... 175/57, 389, 390, 175/122, 135, 56; 299/10, 38, 69, 70, 88, 94; 173/147, 104–111, 165

[56] References Cited
UNITED STATES PATENTS
2,911,192   4/1957   Boucher .............................. 175/56
680,683   8/1901   Ball .................................. 299/88 X
1,130,660   3/1915   Ball et al ............................. 299/38
3,205,951   9/1965   Pyles .............................. 173/147 X
3,231,032   1/1966   Genberg et al ................. 175/389 X FOREIGN PATENTS OR APPLICATIONS
3,152   1876   Great Britain ...................... 299/70

*Primary Examiner*—Ernest R. Purser
*Attorney*—Holman & Stern

[57] ABSTRACT

A method and device for drilling in which a tool or cutting bit is subjected to an oscillatory action. It may also be subjected to a percussive, vibratory or axial thrust action.

13 Claims, 11 Drawing Figures

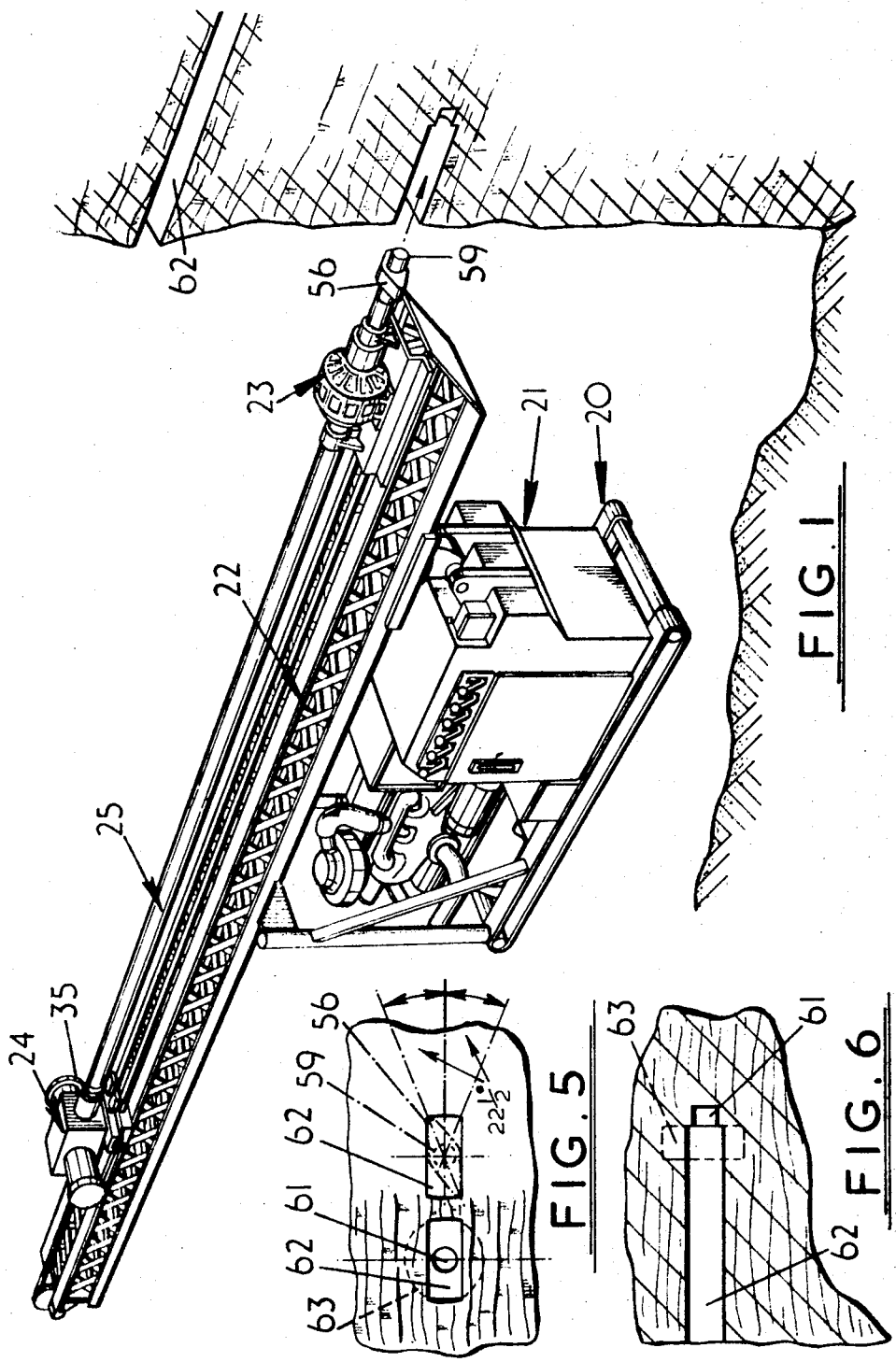

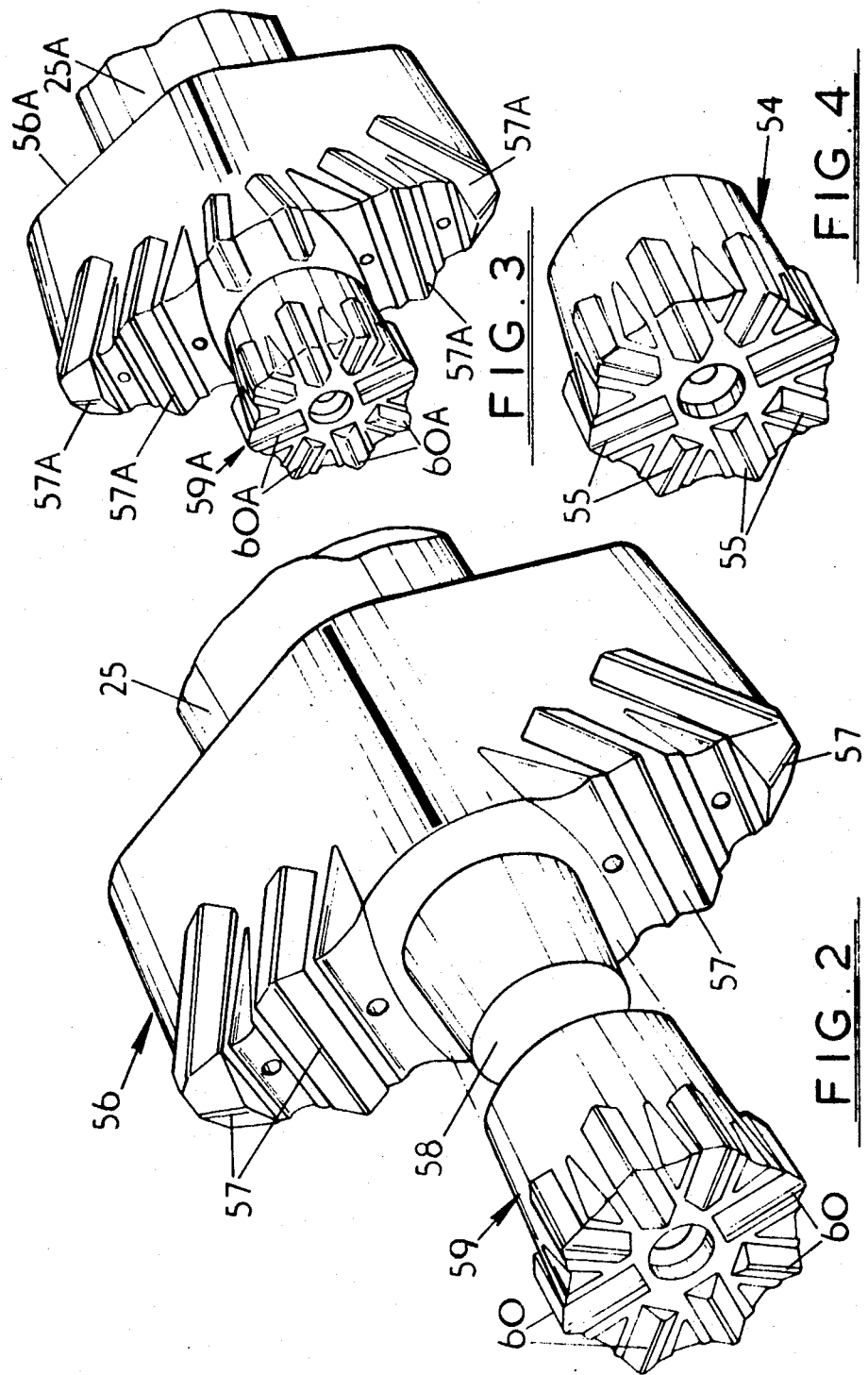

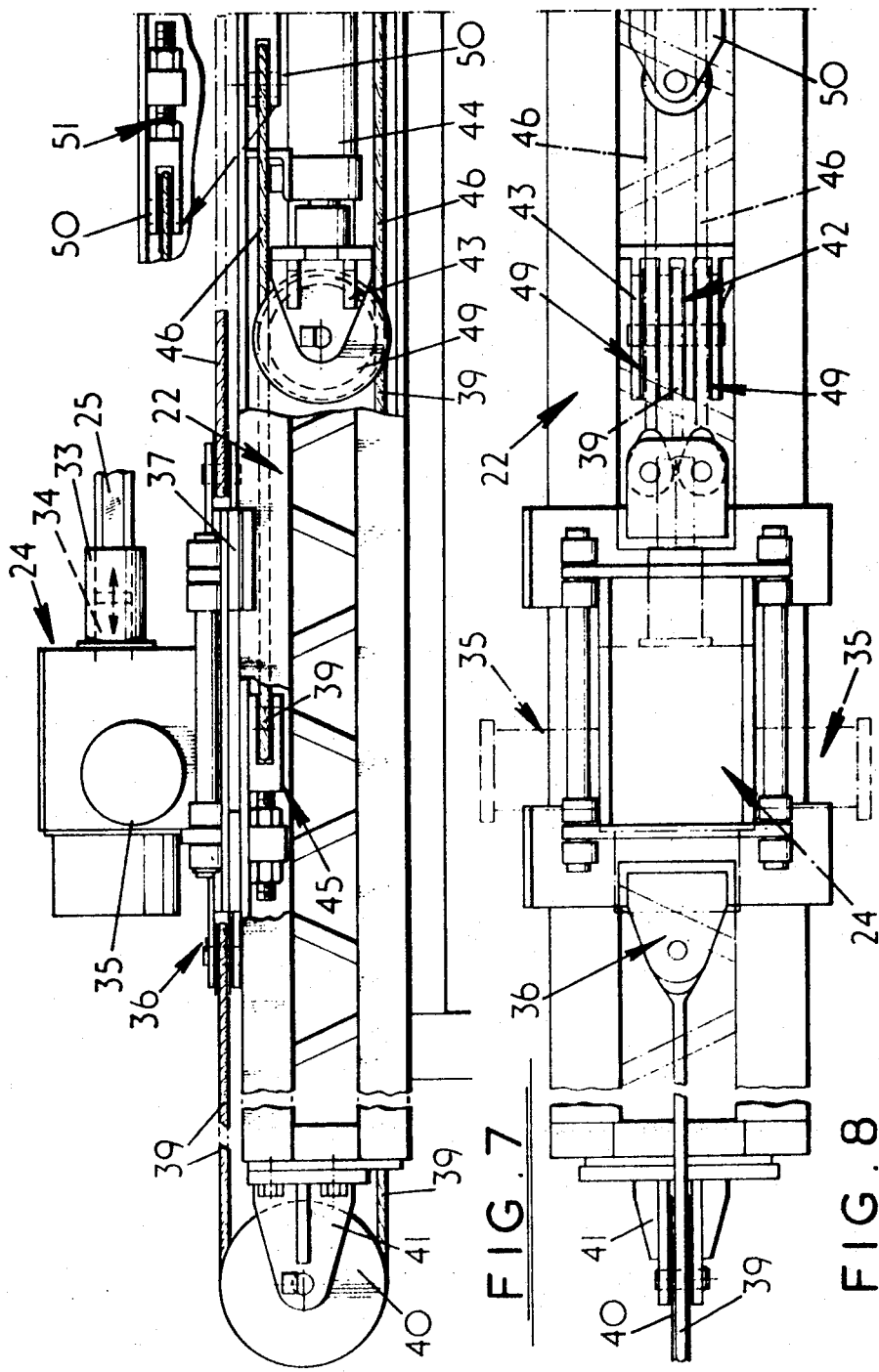

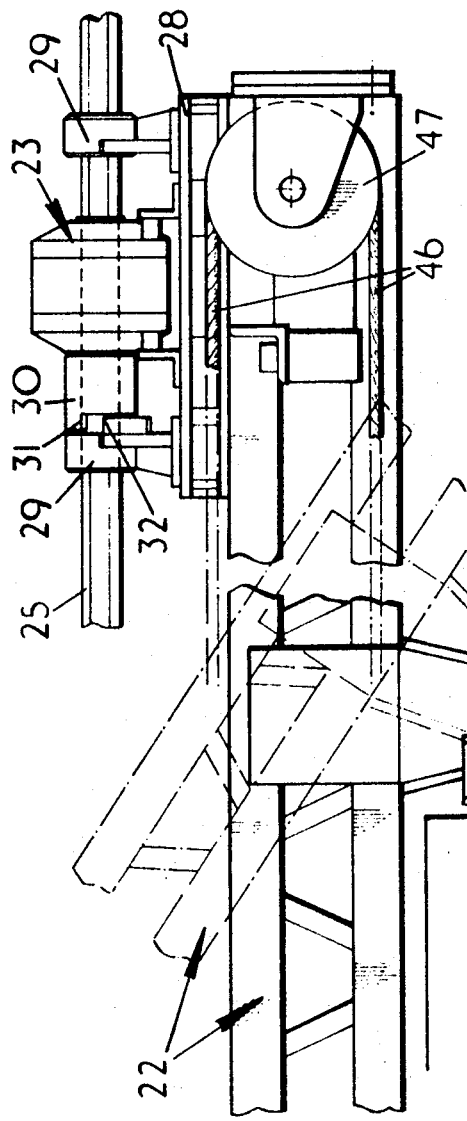
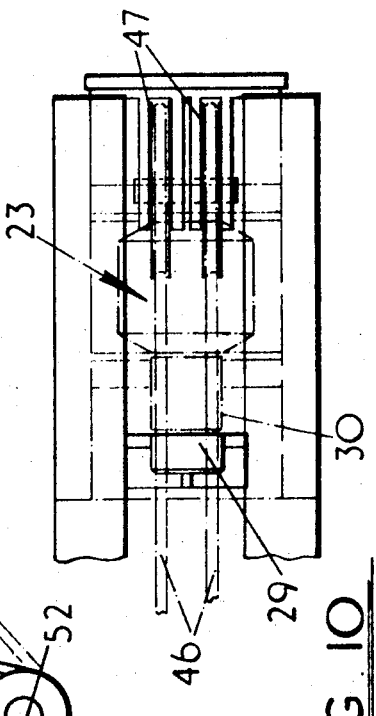
FIG. 9
FIG. 10

3,741,315

DRILLING OR CUTTING OR EARTH STRATA

BACKGROUND OF THE INVENTION

This invention relates to a method of drilling and a drilling device for use in drilling or cutting earth strata, especially but not exclusively the drilling and cutting of earth strata in ore mining.

OBJECTS AND SUMMARY OF THE INVENTION

It is an object of the present invention to provide a drilling method and device which serves to reduce wear on the cutting tool or bit.

According to the present invention there is provided a method of drilling comprising subjecting the cutting tool or bit to an oscillatory motion.

Preferably, the method also includes the step of simultaneously subjecting the cutting tool or bit to a percussive or vibratory force.

Also according to the present invention there is provided a drilling or cutting device comprising a cutting tool or bit and a means for imparting thereto an oscillatory motion.

Preferably, the drilling or cutting device also comprises a means for imparting to the cutting tool or bit a percussive or vibratory force.

The cutting tool or bit is preferably of elongate form, i.e. its cutting face is elliptical, oblong, rectangular, trapezoidal or of such other configuration and/or dimensions that, when it is oscillated, it drills or cuts a rectangular, trapezoidal or other non-circular hole.

The cutting tool or bit is preferably provided at its cutting face with a leading pilot bit, preferably of circular form, which facilitates accurate drilling.

As a result of the present invention there is provided a drilling method and device which has all the advantages of the well-known rotational or rotational-percussive drilling but with the added advantage that is shaves or scrapes the crushed material from previous blows or cuts so that succeeding action of the cutting tool or bit is always on a new strata face thus reducing wear to the cutting tool or bit.

An embodiment of the present invention will now be described, by way of example, with reference to the accompanying drawings, in which:

BRIEF DESCRIPTION OF THE DRAWINGS

FIG. 1 is a perspective view of a drilling or cutting device in accordance with the present invention;

FIGS. 2, 3 and 4 show in perspective view three forms of cutting tool or bit in accordance with the present invention;

FIG. 5 is a hole cut by the drilling or cutting device employing a bit in accordance with FIG. 2;

FIG. 6 is a view similar to FIG. 5 but showing how the drilling or cutting device can be used to undercut a drilled hole;

FIGS. 7 and 8 are respectively fragmentary side and plan views of the percussive end of the drilling device;

FIGS. 9 and 10 are respectively fragmentary side and plan views of the oscillatory end of the drilling device; and, FIG. 11 is a circuit diagram of the hydraulic system of the drilling or cutting device.

DETAILED DESCRIPTION OF THE DRAWINGS

Figure 11:
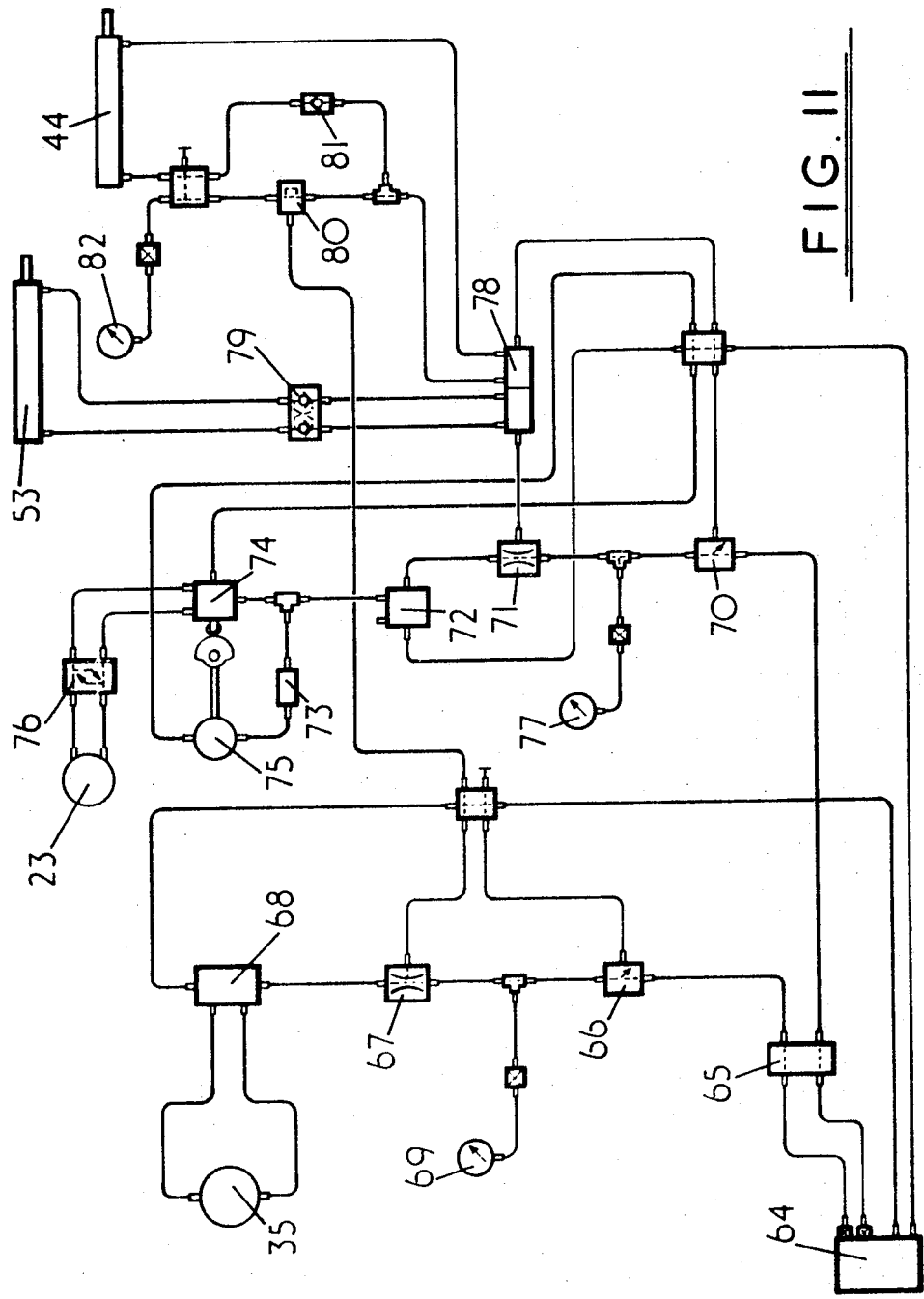

The drilling or cutting device is preferably for use in drilling or cutting earth strata in, for example, ore mining and comprises a base 20 which may be self or externally propelled, a power pack 21 which will be described in detail later, a boom 22 mounted above the base 20 and power pack 21, an oscillatory unit 23 at one end of the boom 22, a percussive unit 24 at the other end of the boom 22, a drill rod 25 which may consist of more than one part, and a cutting tool or bit secured by, for example, screw engagement to the drill rod 25.

The oscillatory unit 23 is positioned stationary on the boom 22 but the percussive unit 24 is movable along the boom 22 towards and away from oscillatory unit 23 by means of ropes and pulleys controlled hydraulically as hereinafter described.

The oscillatory unit 23 (see particularly FIGS. 9 and 10) is a conventional semi-rotary hydraulically operated actuator through the rotor of which the drill rod 25 is axially movable. The oscillatory actuator is supported on a platform 28 secured by welding and/or bolting to the boom 22 which as can be seen is of lattice or openwork construction.

At each side of the oscillatory actuator 23 is a bearing 29 secured to the platform 28 and serving to remove load from the actuator rotor. The drill rod 25, of course, passes through these bearings 29 and also through a tubular member 30 secured to the actuator rotor by welding or otherwise. The tubular member 30 has a non-circular bore, for example, a hexagonal bore, and the drill rod 25 is complementarily shaped so that oscillatory motion of the oscillatory actuator 23 is imparted to the drill rod 25. The tubular member 30 is provided with a formation 31 which co-operates with a stop formation 32 on the adjacent bearing 29 so as positively to arrest oscillatory motion of the actuator rotor and the drill rod 25.

The drill rod 25 at its other end projects into a sleeve 33 of the percussive unit 24 so that it can be acted on by a piston hammer 34 which is fluid operated by a motor 35. The piston hammer 34 may be cam-and-spring actuated, the cam means being driven by the hydraulic motor 35.

The percussive unit 24 is mounted on a platform 36 slidable along the boom 22, the platform 36 having lipped edges 37 which engage the sides of the boom 22. The platform 36 or the boom 22 may be provided with rollers or similar means to facilitate relative movement, between the platform 36 and boom 22.

The platform 36, which as previously indicated is movable by ropes and pulleys and more specifically has secured to one end thereof as indicated at 38 a wire rope, cord or the like 39 which passes around a rotatable pulley 40 carried by a bracket 41 at the end of the boom 22 remote from the oscillatory actuator 23 and along the boom 22 around a pulley 42 carried by a bracket 43 mounted on the piston of a double-acting hydraulic ram 44 back along the boom 22 to where it is again connected to the underside of the platform 36 via a tensioner 45.

The other end of the platform 36 has connected to it two ends of a wire, rope, cord or the like 46 which pass along the boom 22 towards the actuator 23 around two pulleys 47 carried by brackets 48 on the boom 22 and then back along the boom 22 and around two further pulleys 49 (one on each side of the pulley 42) carried by the bracket 43 of the ram 44, the rope 46 then being directed along the boom 22 again in the direction of the actuator 23, the looped end of the rope 46 being engaged around a pulley 50 carried by a tensioner 51 secured to the boom 22.

Thus it will be manifest the action of the ram 44 in one direction causes the platform 36 to be moved away from the oscillatory actuator 23 with single purchase, while action of the ram 44 in the opposite direction causes the platform 36 to be moved with double purchase towards the oscillatory actuator 23.

The boom 22 is shown horizontal but it is pivoted at 52 so that it can be pivoted under the action of a double-acting hydraulic ram 53 to a vertical attitude or an attitude between horizontal and vertical.

Reference is now made to FIGS. 2 to 4 which show various cutting tools and bits.

FIG. 4 shows a circular bit 54 provided with hardened metal (e.g. tungsten carbide) inserts 55. This bit 54 can be detachably but firmly locked on the drill rod 25 and when oscillated cuts or drills a circular hole.

In FIG. 2, there is shown an elongate main bit 56 mounted on the drill rod 25, which bit 56 has hardened metal inserts 57 and is formed with a leading tapered nose 58. This bit 56 can be used in this form or there can be secured on the nose 58 with a tight fit a circular pilot bit 59 also provided with hardened metal inserts 60.

The pilot bit 59 is central of the main bit 56 which may be of elliptical, trapezoidal, rectangular, oval or oblong shape. The main bit 56, provided the degree of oscillation does not exceed 22½° cuts or drills substantially rectangular holes.

The cutting tool or bit of FIG. 3 is similar to that of FIG. 2 and therefore like parts have the same references with the suffix "A." In the instance, the pilot bit 59A is not central of the main bit 56A but is offset relative to the central axis of the main bit 56A. This bit operates substantially as that shown in FIG. 2.

It will be noted that the hardened metal inserts on the bits also extend over part of the peripheral surfaces thereof.

The pilot bits serve, when drilling, to create a "second face" in advance of the main bits and ease the cutting burden of the tool as a whole. The pilot bits also ensure accurate drilling.

The nature and pattern of the hardened inserts are related to the hardness of the ground strata to be drilled. The peripheral cutting inserts take advantage of the oscillating motion of the cutting tool or bit. These provide a constant trimming action and the means to enlarge the drilled section at will.

The setting or lay of the tungsten carbide or hardened inserts is arranged to effect coverage of the hole side, other than that section previously cut by the pilot bit. This ensures that the hole is completely trimmed and prevents fouling of the bit.

The tungsten carbide or other hardened inserts in the main bit have a rounded or taper side or sides. This is to resist possible dislodgement due to opposed impact action.

The cutting tool or bit on application performs several duties:

1. The circular hole provides a free face for the main bit.
2. The side or peripheral cutting faces maintain the hole gauge and section.

Referring now to FIGS. 5 and 6, there is shown, by way of example, drillings effected by the cutting tool or bit of FIG. 2. In FIG. 5 it can be seen that if the cutting tool or bit is oscillated at an angle of 22½° the pilot bit 59 will drill out a circular hole 61 while the main bit 56 will drill out a hole 62 of substantially rectangular section, thrust, vibration or percussive action being applied to the drill rod 25.

If the degree of oscillation exceeds 22½° then the main bit 56 will cut a "butterfly" shaped hole or if the degree of oscillation is sufficient a circular shaped hole. This factor can be used to undercut a hole formed by the cutting tool or bit of FIG. 2.

Undercutting is effected by stopping the axial thrust on the cutting tool or bit and increasing the amplitude of oscillation above 22½°. Such undercutting is indicated at 63. If the increased amplitude is maintained through a maximum arc of 90° then an enlarged volume of diameter equivalent to the larger axis of the main bit 56 will result.

In the case of harder stratas where percussive action is being employed, axial forward and reverse movement of the cutting tool or bit will be maintained without forward thrust while undercutting. This is to ensure the side cutting faces are correctly presented and make cutting easier.

It will be manifest that oscillation of the cutting tool or bit, while drilling means that the hardened metal inserts are continuously presented to fresh faces of the strata thus avoiding a grinding action on the tool and so increasing the useful life of the tool or bit.

In a modification the pilot bit may be rotatably independently of oscillatory movement of the main bit. In this instance the pilot bit will be mounted on a internal drill rod having its own rotational, percussive rotary percussive or vibratory drive.

Thus the main and pilot bits can be employed in conjunction as aforesaid or separately.

The pilot bit always operates in advance of the main bit.

The main bit is oscillated but will accept both common thrust and percussive actions as are applied to the pilot bit as desired.

The pilot bit may be advanced any distance beyond the main bit.

The abovedescribed drilling or cutting device has application inter alia, in reef or vein-type mining and general drilling with the facility of undercutting or underreaming.

The hydraulic control circuit of the drilling or cutting device will now be described with reference to FIG. 11.

The hydraulic control circuit comprises a hydraulic liquid supply tank 64 which delivers hydraulic liquid under pump pressure of a dual pump 65 via piping or hoses as shown to (i) a relief valve 66, a flow regulator valve 67, a control valve 68, and the percussive unit motor 35, a pressure gauge 69 being connected to this part of the system, and the flow regulator valve 67 determining the speed of the motor 35 and so the percussive force on the drill rod 25; (ii) a relief valve 70, a flow regulator valve 71, a control valve 72 for the oscillatory actuator 23, a a speed control valve 73, a cam-operated directional valve 74 which controls the direction of movement of the actuator motor 75, a dual relief valve 76 being located between the actuator and directional valve 74 and a pressure gauge 77 is connected also to this part of the system.

The flow regulator 71 communicates with a dual control valve 78 connected via an overcenter valve 79 with the ram 53 controlling the attitude of the boom 22 and via a pressure reducing valve 80 and a non-return valve 81 to a pressure gauge 82 and the double-acting ram 44 controlling movements of the carriage 36.

The other connections of the hydraulic control system are obvious from the drawing.

When it is desired to effect a drilling operation the cutting tool or bit is presented to the rock face and assuming the drill rod 25 is to be advanced horizontally then the boom ram 53 is not operated. The pump 65 is driven by a convenient motor and the ram 44, oscillatory actuator 23 and percussive motor 35 are hydraulically powered under the control of the flow regulating valves 67 and 71 so that the drill rod is axially moved into the rock face while being simultaneously subjected to oscillatory and axially percussive actions to effect a cutting or drilling operation as aforesaid.

It will be manifest that the drill rod and cutting tool or bit are readily withdrawn after completion of the operation.

The drill rod is hollow as is customary to receive a flow of clearing air, the drill bits being appropriately apertured.

It will also be manifest that the cutting tool or bit may simply comprise the main bit of FIG. 2 without its nose, i.e. it may simply be of any of the aforementioned elongate configurations without a nose and pilot bit.

What is claimed is:

1. An apparatus for drilling or cutting earth strata comprising a base, a boom mounted in the base, a drill rod, having opposite ends, said drill rod being arranged parallel with the boom and movable relative thereto, a cutting tool or bit secured to one end of the drill rod, a percussive unit movably mounted on the boom acting on the opposite end of the drill rod to apply axial percussive forces thereto, an oscillatory unit mounted on the boom and traversed by the drill rod so that the drill rod is movable axially of the oscillatory unit while being subject to transverse oscillatory movements thereby, and means moving the percussive unit and consequently the drill rod and cutting tool or bit along the boom to urge the latter into the earth strata.

2. The apparatus according to claim 1 comprising a carriage movable along the boom and mounting the percussive unit acting on the other end of the drill rod.

3. The apparatus according to claim 2 in which the carriage is movable along the boom by axial thrust means comprising a double-acting fluid ram connected to the carriage by flexible elements and pulleys.

4. The apparatus according to claim 3, in which the carriage, at one end, is secured to a pulley connected to the piston of the double-acting fluid ram by a single wire rope to give single purchase to the carriage when it is being moved away from the drilling end of the apparatus while it is secured at its other end by two wire ropes to a pair of pulleys connected to the ram piston so that double purchase is given to the carriage when it is being moved towards the drilling end of the apparatus.

5. The apparatus according to claim 1, in which the boom is pivotally mounted on the base and its attitude relative to the base is controlled by a fluid operated ram.

6. The apparatus according to claim 5 comprising a hydraulic control system operating the oscillatory unit, the percussive unit, the double-acting fluid ram and the fluid operated ram for pivoting the boom.

7. The apparatus according to claim 1, in which the cutting tool or bit is of circular configuration and has hardened metal inserts.

8. The apparatus according to claim 1, in which the cutting tool or bit is of transversely elongated configuration with hardened metal inserts.

9. The apparatus according to claim 8, in which the hardened metal inserts are provided both on the leading face of the tool or bit and on the peripheral surface.

10. The apparatus according to claim 8, in which the tranversely elongate bit is provided with a leading pilot bit of circular configuration and also provided with hardened metal inserts.

11. The apparatus according to claim 9, in which the pilot bit is central of the tranversely elongated bit.

12. The apparatus according to claim 9, in which the pilot bit is offset of the central axis of the transversely elongate bit.

13. Apparatus according to claim 1, comprising means limiting the oscillatory movement of the oscillatory unit and consequently the drill rod to 22½°.

* * * * *